Jan. 27, 1970     P. E. BOUTMY     3,492,590
METHOD AND APPARATUS FOR REGENERATING BIPOLAR PULSES
Filed Oct. 9, 1967     3 Sheets-Sheet 1

PATRICK EMILE BOUTMY,
INVENTOR
by Stephen H. Frishauf
Atty

United States Patent Office 3,492,590
Patented Jan. 27, 1970

3,492,590
METHOD AND APPARATUS FOR REGENERATING BIPOLAR PULSES
Patrick Emile Boutmy, Paris, France, assignor to Societe Anonyme de Telecommunications, Paris, France, a company of France
Filed Oct. 9, 1967, Ser. No. 673,710
Claims priority, application France, Apr. 7, 1967, 101,925
Int. Cl. H03k 5/00
U.S. Cl. 328—164                                  4 Claims

ABSTRACT OF THE DISCLOSURE

This invention relates to the regeneration of distorted bipolar pulses of predetermined duration by rectifying the distorted pulses, deriving unipolar timing pulses from said rectified pulses, forming two series of control signals by respectively adding and subtracting the distorted pulses and said timing pulses, forming return-to-zero pulses by delaying said timing pulses by a time substantially equal to the predetermined duration of the undistorted bipolar pulses, initiating positive and negative regenerated pulses when said additive and subtractive control signals respectively overshoot predetermined thresholds, and ending said regenerated pulses when said return-to-zero pulses are formed.

---

The present invention concerns a method of and an apparatus for regenerating bipolar pulses, notably coded modulation pulses. When pulses of this kind have been transmitted, notably along lines, they are deformed and disturbed by noise. By the method and the apparatus according to the present invention, it is possible to reconstitute from the pulses received at the end of the line the pulses which have been transmitted from the beginning of the said line, or at the very least pulses of very similar shapes.

Amplifier-regenerators for pulses of the aforesaid type are already known, in which the pulses received, after amplification and correction of the amplitude distortions, are transmitted on the one hand to a retiming circuit, and on the other hand to the first input of an AND gate circuit, the second input of which receives the recovered timing pulses. Finally, the output of the AND gate circuit is connected to a reshaping circuit.

The method according to the present invention is distinguished from that applied in these known amplifier-regenerators, and it affords, as compared therewith, many advantages which will hereinafter be indicated. The method of the invention is characterized in that unipolar timing pulses are recovered from the pulses to be regenerated, which have previously been rectified, in that two series of control signals are formed, by addition and subtraction of the timing pulses and of the pulses to be regenerated, respectively, in that there are derived from the said timing pulses return-to-zero pulses, appropriately delayed in relation to the timing pulses, and in that, on the one hand, the leading edges of the regenerated pulses are initiated, in accordance with their polarity, by one or other of the two series of control signals, when the latter exceed appropriate threshold, while on the other hand their trailing edges are initiated by the return-to-zero pulses.

The present invention also concerns an apparatus for carrying out the aforesaid method, which makes systematic use of a component known as a "matched hybrid transformer," the operating principle and construction of which will hereinafter be recalled. It is sufficient to indicate at this stage that it is an eight-terminal network, which may be employed notably in either one of the following two ways: either a signal is applied to a single input of the eight-terminal network, which produces at its two opposed outputs, respectively, signals identical to the input signal, or at one of them an output signal identical to the input signal, and at the other one an output signal of opposite polarity to the input signal; or two distinct signals are applied to two opposed inputs of the eight-terminal network, which then produces at its two opposed outputs, respectively, the sum and the difference of the input signals.

The apparatus for regenerating the bipolar pulses, notably coded modulation pulses, according to the present invention, is characterised by the following points, applied separately or preferably in their various combinations:

(a) Between the input of the apparatus and, on the one hand, a circuit for recovering timing pulses, notably of a type known per se, and on the other hand a circuit for forming control signals and return-to-zero pulses, there is inserted at least one gating circuit, comprising a matched hybrid transformer, of known type, of which two opposed inputs are connected to the input of the apparatus, respectively, by diodes of opposed polarities, while its first output, which produces the difference of the input signals, is connected to the input of the said retiming circuit, and its second output, which produces the sum of the input signals, is connected to one of the inputs of the said control signal forming circuit.

(b) The aforesaid forming circuit comprises, for forming control signals, a first matched hybrid transformer, whose input is connected to the output of the retiming circuit, while its first output, which produces the input signal, is connected to the first input of a second matched hybrid transformer, whose second input, opposed to the first, is connected to the corresponding output of the gating circuit, optionally through an amplifier, the two series of control signals, formed respectively by the sum and the difference of the timing pulses and bipolar pulses similar to the pulses to be regenerated, being produced respectively at the two opposed outputs of the said second hybrid transformer.

(c) The aforesaid forming circuit comprises, for forming return-to-zero pulses, a third matched hybrid transformer whose input is connected, through a time delay circuit, to the second output of the first hybrid transformer, which produces pulses identical to the timing pulses, but of opposite polarity, two identical return-to-zero pulse series, delayed in relation to the timing pulses, and of opposite polarity, being produced at the opposed outputs of the said third hybrid transformer.

(d) Two triggering-threshold bistable multivibrator circuits each receive at their triggering inputs one of the two control signal series and at their return-to-zero inputs one of the two return-to-zero pulse series, and their respective outputs are connected to the two opposed inputs of a matched hybrid transformer, at the two outputs of which the regenerated pulses appear in the form of two square-wave pulse series, which are respectively bipolar (as are the pulses to be regenerated) and unipolar (for particular applications).

The systematic use of matched hybrid transformers in the apparatus according to the invention makes it possible to regenerate pulses with minimum loss of energy. On the other hand, although it is intended to regenerate bipolar pulses, the apparatus according to the present invention may also pass a series of successive pulses which do not all have alternate polarities. This property may be utilised, for example, for effecting a synchronisation, the synchronising information then being supplied by the temporary interruption of the alternation of the polarities of the successive pulses.

One of the important advantages of the apparatus according to the invention resides in the mode of feeding the timing pulse recovery circuit from the pulses to be regenerated, which are transmitted thereto by the gating circuit, because the diodes comprised in the latter suppress, by means of a threshold effect, a considerable fraction of the noise which disturbs the pulses to be regenerated. The retiming circuit itself may be, for example, of known type, comprising in series a band-pass filter, a tunnel diode oscillator and a shaping circuit, which also comprises a tunnel diode.

By way of example, there is described in the following and diagrammatically illustrated in the accompanying drawings one embodiment of an apparatus for carrying out the method according to the present invention.

Figure 1:
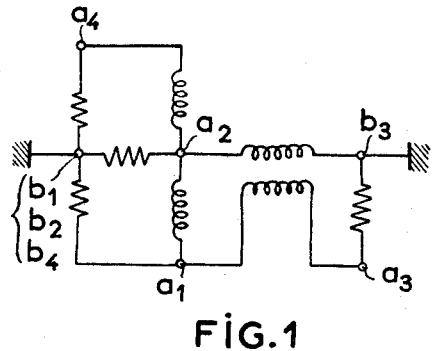
FIGURE 1 is the electric circuit diagram of a known form of construction of a matched hybrid transformer.

FIGURE 3 diagrammatically illustrates various possibilities of employing a matched hybrid transformer such as that of FIGURE 1.

Figure 4:
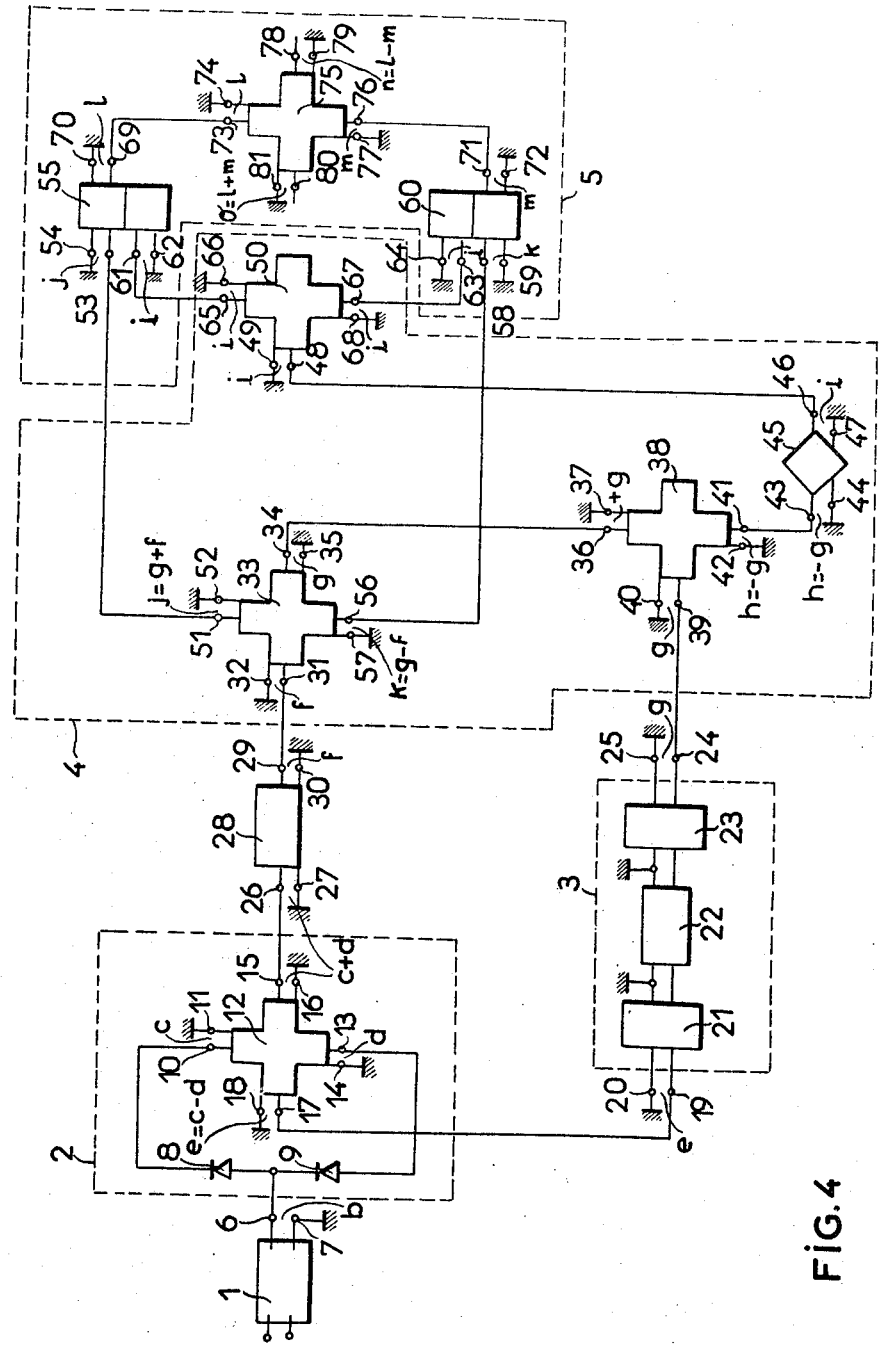

FIGURE 4 is the block diagram of one form of construction of the apparatus for amplifying and regenerating bipolar coded modulation pulses according to the present invention.

Figure 5:
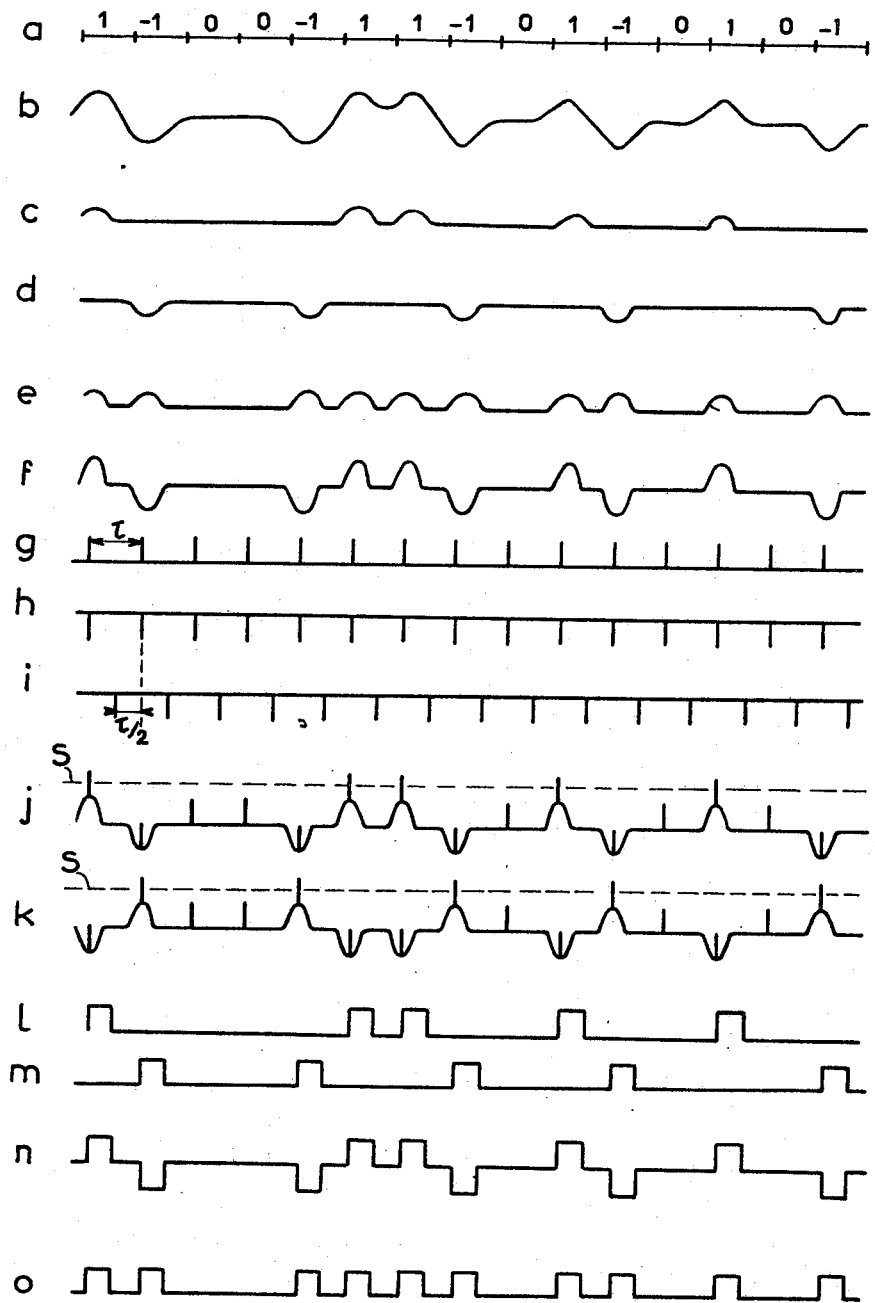

FIGURE 5 illustrates the wave forms at the various points $a$ to $o$ of the circuits of FIGURE 4.

Figures 2, 3A:
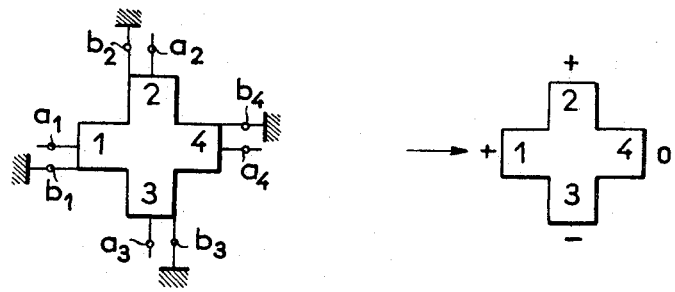
FIGURE 2 shows the symbol which will be employed in the succeeding figures for a matched hybrid transformer, for example of the type illustrated in FIGURE 1.
Figures 3B, 3C:
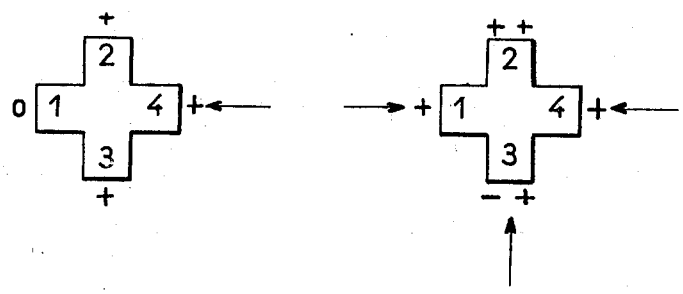

A matched hybrid transformer such as that whose circuit diagram is illustrated in FIGURE 1 with its balancing resistors is described in the article by C. L. Ruthroff, published in "Proceedings of I.R.E.," August 1959, pages 1337 to 1342, and entitled "Some broad-band transformers." FIGURE 2 is a symbolic illustration thereof, showing the four pairs of terminals $a1-b1$ to $a4-b4$, the four terminals $b1$ to $b4$ being for example, earthed.

The parts $a$ to $c$ of FIGURE 3, illustrate respectively three different possibilities of employing a matched hybrid transformer of the type illustrated in FIGURE 1, which are in fact employed in the apparatus according to the present invention. In each case, the input or inputs of the eight-terminal network are denoted by arrows, and the polarity of the signal applied to each input of the eight-terminal network, and that of the signal resulting therefrom at each of its outputs, are indicated by the sign $+$ or by the sign $-$. In the case $a$, the signals appearing at the two opposed outputs are respectively of the same polarity as the single input signal, and are of opposite polarity; in case $b$, the signals appearing at the two opposed outputs have the same polarity as the single input signal, and finally in case $c$ signals are assumed to be applied to two opposed inputs, and there is set up at the two outputs, also opposed to one another, the sum and the difference respectively, of the input signals.

The form of construction of the apparatus according to the present invention which is diagrammatically illustrated in FIGURE 4 is intended to regenerate pulses of the type illustrated in the diagram $b$ of FIGURE 5. These pulses are more particularly deformed pulses received at the end of a transmission line, to the beginning of which there have been applied the bipolar coded modulation pulses, also represented by chain lines in diagram $b$ of FIGURE 5. These bipolar pulses are of the "half-baud" type, with for example, a modulation speed of 100 megabauds. The diagram $a$ of FIGURE 5 illustrates the digital values of the said bipolar pulses.

The pulses $b$ to be regenerated are applied to the terminals 6 and 7 of the arrangement of FIGURE 4, after having passed through an amplifier-corrector 1. These pulses $b$ to be regenerated are thus transmitted to the input of a gating circuit 2, of which a first output 17–18 is connected to the input 19–20 of a retiming circuit 3, while the second output 15–16 of the gating circuit 2 is connected to the first input 31–32 of a forming circuit 4, whose second input 39–40 is connected to the output 24–25 of the said retiming circuit 3. The four outputs 51–52, 56–57, 65–66 and 67–68 of the forming circuit 4 are on the other hand connected respectively to the four inputs 53–54, 58–59, 61–62 and 63–64 of a regenerated pulse forming circuit 5.

The constitution of the various circuits 2 to 5 will now be described in detail.

The output terminals 6 and 7 of the amplifier-corrector 1 are connected to the input of a gating circuit 2, which comprises two diodes 8 and 9. The diode 8 is conductive for the positive portion of the pulses $b$ to be regenerated, which are fed to the first pair of input terminals 10 and 11 of a matched hybrid transformer 12, for example of the type illustrated in FIGURE 1 (diagram $c$ of FIGURE 5). Likewise, the diode 9 is conductive for the negative portion of the pulses $b$ to be regenerated, which are fed to the input terminals 13 and 14 of this same transformer 12 (diagram $d$). In addition to gating the pulses in accordance with their polarity, the diodes 8 and 9 carry out a first pulse regeneration stage by bottom clipping, by reason of their operating thresholds.

In accordance with the above-described properties of the matched hybrid transformer, notably when it is employed in accordance with FIGURE 3$c$, there are collected at the output terminals 15 and 16 of the transformer 12 pulses similar to the pulses to be regenerated, present between the terminals 6 and 7 (diagram $f$), and there are collected at the output terminals 17 and 18 pulses obtained by rectification of these same pulses to be regenerated (diagram $e$). The terminals 17 and 18 are connected to the input terminals 19 and 20 of the retiming circuit 3, which consists in known manner of a band-pass filter 21, followed by a tunnel diode oscillator 22, which is in turn connected to a shaping circuit 23, which also comprises a diode, and the output terminals 24 and 25 of which constitute the output terminals of the retiming circuit 3. Between these terminals 24 and 25, there is collected a train of brief positive pulses (diagram $g$) whose repetition frequency is equal to the modulation frequency of the pulses to be regenerated. The terminals 15 and 16 are connected to the input terminals 26 and 27 of an amplifier 28 whose output terminals 29 and 30 are connected to the input terminals 31 and 32 of another hybrid transformer 33, forming part of the forming circuit 4. This transformer 33 also receives between its input terminals 34 and 35, which are opposed to the preceding ones, positive timing pulses identical to those obtained at the output of the circuit 3 (diagram $g$), because the terminals 34 and 35 are connected to the output terminals 36 and 37 of another hybrid transformer 38, which also forms part of the circuit 4, and the input terminals 39 and 40 of which are connected to the output terminals 24 and 25 of the circuit 3. The second pair of output terminals 41 and 42 of this hybride transformer 38 (operating in accordance with FIGURE 3$a$), between which there are also collected timing pulses identical to the pulses $g$, but negative (diagram $h$), is connected to the input terminals 43 and 44 of a delay circuit 45. If the pulses received are "half-baud" bipolar pulses with a modulation speed of 100 megabauds, the value of the delay produced by this circuit 45 is so chosen that the timing pulses collected between its output terminals 46 and 47 (diagram $i$) lag in relation to the positive timing pulses $g$ collected at the terminals 36 and 37 by a time in the neighbourhood of their repetition half-period $\tau$, i.e. 5 nanoseconds in the above-indicated numerical example.

The terminals 46 and 47 are connected to the input terminals 48 and 49 of another hybrid transformer 50 also forming part of the circuit 4. This matched hybrid transformer 50 is employed in accordance with FIGURE 3$b$, in such manner that there is collected at the output terminals 65 and 66 and at the output terminals 67 and 68 a signal identical to the input signal, namely the pulses $i$, which are negative and delayed, by $\tau/2$ when the signals received are of the "half-baud" type, in relation to the positive pulses g with which the terminals 34 and 35 of the hybrid transformer 33 are supplied. The first pair of output terminals 51 and 52 of the said transformer 33, in which the sum of the pulses f to be regenerated and of the positive timing pulses g (diagram j) is collected, is connected to the pair of triggering control terminals 53 and 54 of a threshold bistable multivibrator circuit 55, which forms part of the circuit 5. The second pair of output terminals 56 and 57 of the matched hybrid transformer 33, in which the difference of the positive timing pulses g and of the pulses f to be regenerated (diagram k) is collected, is connected to the pair of triggering control terminals 58 and 59 of a threshold bistable multivibrator 60, also forming part of the circuit 5. The pairs of return-to-zero terminals 61 and 62, 63 and 64 of the same multivibrator circuits 55 and 60 are supplied by the outputs 65 and 66, 67 and 68 of the said hybrid transformer 50.

Since the multivibrator circuits 55 and 60 are initially in the "off" condition, no voltage is collected at their output terminals 69 and 70, 71 and 72. The arrival at the pair of input terminals 53 and 54, or 58 and 59, of a positive pulse whose level exceeds a certain threshold S (diagrams j and k), which is in practice higher than the level of the pulses to be regenerated and higher than that of the timing pulses, but lower than the minimum level reached by the sum of the pulses to be regenerated and of the timing pulses, causes the corresponding multivibrator circuit to change to the state in which a positive voltage is set up between its output terminals. The triggering threshold S of the multivibrator circuits 55 and 60 effectively eliminates the disturbing influence of noise on the regeneration of the pulses. The multivibrator is thereafter brought back from this state to its initial state by the delayed negative pulse i which arrives at its other pair of input terminals 61 and 62, or 63 and 64, after a time τ/2 determined by the delay circuit 45. The output terminals 69 and 70 of the multivibrator circuit 55 are connected to the input terminals 73 and 74 of a matched hybrid transformer 75, whose input terminals 76 and 77, opposed to the preceding ones, are connected to the output terminals 71 and 72 of the multivibrator circuit 60. The regenerated bipolar pulses (diagram n) are therefore collected at the output terminals 78 and 79 of this hybrid transformer 75, which operates in accordance with FIGURE 3c, the said output terminals also being the output terminals of the apparatus according to the invention.

For certain applications, for example for the construction of a remote location apparatus, the other output terminals 80 and 81 of the transformer 75 also serve as output terminals for the apparatus, between which regenerated unipolar pulses (diagram o) are then available. In accordance with the requirements, amplifiers may be inserted between the multivibrator circuits 55, 60 and the matched hybrid transformer 75, or between the output terminals of the said transformer 75 and the output terminals proper of the apparatus according to the invention.

The present invention is not limited to the embodiment described and illustrated, but includes all combinations of means, which may be known, for applying the method according to the invention for regenerating, by amplification, bipolar pulses, notably coded modulation pulses.

What I claim is:

1. A method for regenerating distorted bipolar pulses of a predetermined duration, consisting essentially in rectifying the distorted pulses, deriving unipolar timing pulses from said rectified pulses, forming two series of control signals by respectively adding and substracting the distorted pulses and said timing pulses, forming return-to-zero pulses by delaying said timing pulses by a time substantially equal to the predetermined duration of the undistorted bipolar pulses, initiating positive and negative regenerated pulses when said additive and subtractive control signals respectively overshoot predetermined thresholds, and ending said regenerated pulses when said return-to-zero pulses are formed.

2. An apparatus for regenerating distorted bipolar pulses of a predetermined duration, comprising essentially rectifier means for the distorted pulses, means triggered by the rectified pulses for generating short, unipolar timing pulses, an adding and a substracting circuit for forming with the distorted pulses and said timing pulses, respectively additive and subtractive control signals, a delay circuit for forming with said timing pulses, return-to-zero pulses delayed by a time substantially equal to the predetermined duration of the undistorted bipolar pulses, a first and a second threshold bistable bistable circuit connected to be set respectively by said additive and subtractive control signals, and to be reset by said return-to-zero pulses, whereby said bistable circuits generate square, unipolar output pulses of the same predetermined duration as the undistorted bipolar pulses, and a further subtracting circuit for forming regenerated bispolar pulses with the output pulses of said two bistable circuits.

3. The apparatus of claim 2, in which said adding and subtracting circuits consist of matched hybrid transformers.

4. An apparatus for regenerating distorted bipolar pulses of a predetermined duration, comprising essentially five matched hybrid transformers, each having four pairs of terminals, two diodes connected with opposed polarities for transmitting the distorted positive and negatiive pulses respectively to the second and third pair of terminals of said first hybrid transformer, a circuit for generating short, unipolar timing pulses, having an input connected to the first pair of terminals of said first hybrid transformer, and an output connected to the first pair of terminals of said second hybrid transformer, said third hybrid transformer having its first and fourth pair of terminals respectively connected to the fourth pair of terminals of said first hybrid transformer and to the second pair of terminals of said second hybrid transformer, a delay circuit for delaying pulses by a time substantially equal to the predetermined duration of the undistorted bipolar pulses, said delay circuit being inserted between the third pair of terminals of said second hybrid transformer and the first pair of terminals of said fourth hybrid transformer, a first and a second threshold bistable circuit, having set inputs respectively connected to the second and third pair of terminals of said third hybrid transformer, reset inputs respectively connected to the second and third pair of terminals of said fourth hybrid transformer, and outputs respectively connected to the second and third pair of terminals of said fifth hybrid transformer, whereby regenerated bipolar pulses are delivered on the fourth pair of terminals of said fifth hybrid transformer.

References Cited

UNITED STATES PATENTS 3,390,283  6/1968  Hannigsberg _____ 307—268

DONALD D. FORRER, Primary Examiner

STANLEY D. MILLER, Assistant Examiner

U.S. Cl. X.R.

307—268